United States Patent [19]
Whalen

[11] Patent Number: 4,907,617
[45] Date of Patent: Mar. 13, 1990

[54] SAFETY VALVE FOR A COMPRESSION GAS CYLINDER

[76] Inventor: Paul S. Whalen, St. Rte. Box 411, Placitas, N. Mex. 87043

[21] Appl. No.: 269,170

[22] Filed: Nov. 9, 1988

[51] Int. Cl.$^4$ ............................................. F16K 17/40
[52] U.S. Cl. ..................................... 137/71; 137/68.1
[58] Field of Search ................................. 137/68.1, 71

[56] References Cited

U.S. PATENT DOCUMENTS

| | | | |
|---|---|---|---|
| 1,698,616 | 1/1929 | Woodham | 137/71 X |
| 2,563,244 | 8/1951 | Holicer | 137/71 X |
| 2,719,532 | 10/1955 | Grant, Jr. | 137/68.1 |
| 2,945,503 | 7/1960 | Atkinson | 137/68.1 |
| 3,605,948 | 9/1971 | Wynn | 137/68.1 X |
| 3,645,286 | 2/1972 | Follett | 137/68.1 |
| 3,648,893 | 3/1972 | Whiting | 137/68.1 X |
| 3,930,517 | 1/1976 | Gagala | 137/71 X |
| 4,077,422 | 3/1978 | Brinkley et al. | 137/68.1 |
| 4,562,852 | 1/1986 | Britt | 137/68.1 |
| 4,562,962 | 1/1986 | Hartman | 137/68.1 X |

Primary Examiner—John Rivell
Attorney, Agent, or Firm—Frederick Gotha

[57] ABSTRACT

A safety valve device for a compression gas cylinder to shut off gas flow at the tank port of the cylinder when downstream gas flow control apparatus is structurally distrupted is set forth which includes a housing having a conduit therethrough for the passage of gas where the housing is adapted for fitting into the tank port of the cylinder. A poppet seat is located in the conduit and is in a fixed position relative to the tank port. A poppet which passes through the poppet seat is adapted to close the conduit when the poppet bears against the poppet seat. A helical spring is used to bias the poppet to bear against the poppet seat such that the conduit would be normally closed. However, a frangible set-off columnar member is compressively disposed between the poppet and the gas control apparatus such that structural disruption of the gas control apparatus will cause the frangible set-off member to break thereby closing the conduit and preventing gas flow from the compression gas cylinder.

30 Claims, 1 Drawing Sheet

SAFETY VALVE FOR A COMPRESSION GAS CYLINDER

FIELD OF THE INVENTION

This invention relates to a safety valve device for a compression gas cylinder to shut off the gas flow when downstream gas flow control apparatus is structurally disrupted.

BACKGROUND OF THE INVENTION

The flow of gas from a compression gas cylinder is controlled by a control valve which is fitted into the tank port of the gas cylinder. When structural damage occurs to the control valve apparatus resulting in a break or failure of the material of which the valve is constructed, a dangerous condition exists which may result in an explosion of the control apparatus sending fragments into many directions at high velocity and the tank itself may become a projectile as the unregulated gases exhaust from the gas cylinder. Additionally, where corrosive gases or other types of gases harmful to individuals or the environment escape, there may be serious injuries sustained by the persons and environments exposed to the gas.

SUMMARY OF THE INVENTION

There is, therefore, provided according to the present invention, a safety valve device for a compression gas cylinder to shut off gas flow at the tank port of the cylinder when downstream gas flow control apparatus is structurally damaged by external forces before a failure occurs in the gas flow control apparatus.

The present invention is directed to a safety valve device which is composed of a housing having a conduit therethrough for the passage of gas where the housing is adapted for fitting into the tank port of a compression gas cylinder. A poppet seat is located within the conduit in a fixed position relative to the tank port and a poppet passes through the poppet seat such that when the poppet bears against the poppet seat the conduit is closed thereby preventing gas flow into the inlet port of the main gas control valve. The invention incorporates a helical spring which biases the poppet into the poppet seat so that the conduit would normally be closed in the housing; however, a frangible member is compressively disposed between the poppet and the gas control valve inlet port which holds the poppet off of the poppet seat and thereby holds the conduit open. The frangible member bears against a shoulder in the housing of the control valve where the shoulder is located upstream of the inlet port of the control valve. The frangible member in one embodiment of the invention is made of silicon carbide which is a ceramic and corrosion resistent to certain types of gases. It has a high tensile and low shear strength such that when sufficient external forces are applied to the main control valve, sufficient bending and shear stress acting on the frangible member will break the member before the gas control valve breaks. The poppet will then be caused to bear into the poppet seat thereby closing the conduit and preventing gas flow through the tank port of the gas cylinder.

In the preferred embodiment, the frangible member is a columnar member which has a upstream or first chamber that sealingly encloses a perforated plate. The perforated plate allows gas to flow into the upstream chamber through the tank port of the gas cylinder. Located adjacent the downstream chamber, the frangible member has a minimum cross-section area which is intermediate the upstream chamber and a second or downstream chamber. Both chambers contain an orifice which permits gas to flow through them where the orifices act as gas regulators if there is a structural disruption downstream of the main control valve. The frangible member is compressively held between a shoulder located in the main valve body at the inlet port of the main control valve and the poppet of the safety valve such that the external forces acting on the main valve will be transmitted to the frangible member. When the external forces are of sufficient magnitudes, the forces transmitted through the main valve housing will cause the frangible member to break at the minimum cross-sectional area.

In another embodiment, the frangible member may consist of a columnar member which breaks under sufficient bending and shear stress.

Thus, in the event the main gas control valve experiences structural disruption, a safety valve fitted into the tank port of the compression gas cylinder will prevent gas flow into the main valve preventing fragmention of the main valve and the concomitant dangers therewith.

BRIEF DESCRIPTION OF THE DRAWINGS

These and other features and advantages will become appreciated as the same become better understood with reference to the following specification, claims and drawings wherein:

DETAILED DESCRIPTION

Figure 1:
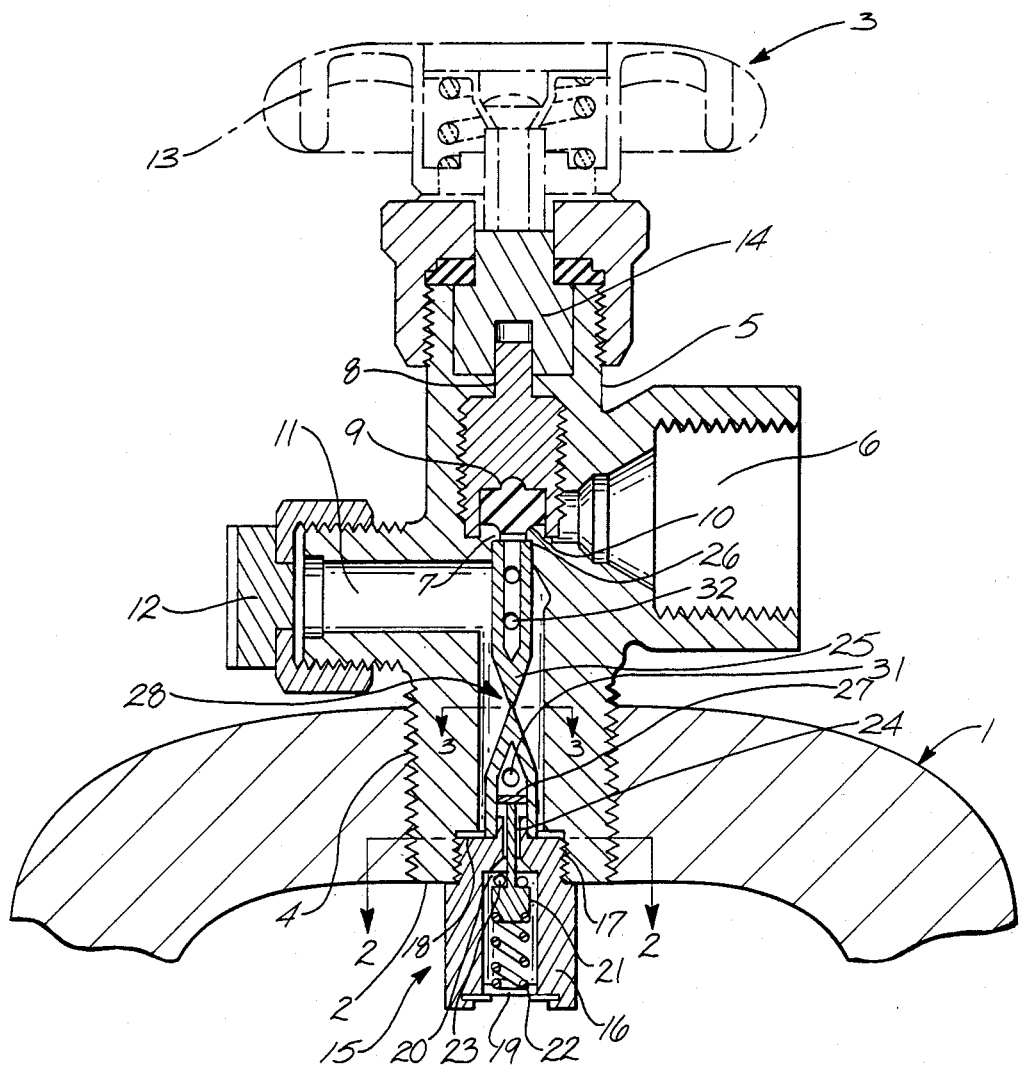
FIG. 1 is a cross-sectional view of the main control valve and gas compression cylinder illustrating the present invention.
Figure 2:
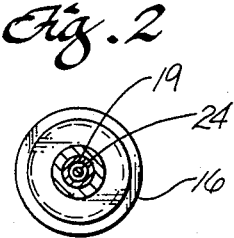
FIG. 2 is a cross-section of FIG. 1, in the direction of line 2—2 shown on FIG. 1.
Figure 3:
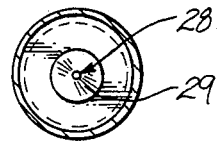
FIG. 3 is a cross-section in the direction of line 3—3 shown on FIG. 1.

Referring to FIG. 1, a cross-section is shown of a gas compression cylinder 1 which has a threaded tank port 2 into which is fitted the connector stem 4 of the main control valve 3. The main control valve 3 has a main body 5 which contains an outlet port 6 and an inlet port 7. Adjacent to the inlet port 7 is a controllable valve stem 8 which contains a seating member 9 that closes the main valve inlet port 7 when the seating member 9 bears in compression against the inlet port seat 10. Within the main body 5 of the control valve assembly 3 is a cylindrical cavity 11 which extends through the connector stem 4 and communicates with relief valve 12. The relief valve is connected to the main valve body 5.

In operation the valve control assembly 3 is operated by rotating the control knob 13 which is linked to the control valve stem 8 by linking member 14 such that upon rotation of the knob 13 the linking member will cause rotation in a like direction of the controllable valve stem 8. Thus, the seating member 9 by appropriate rotation of control knob 13 will unseat from inlet port seat 10 thereby opening the inlet port 7 of the main valve body 5, allowing gas to flow into outlet port 6.

As shown in FIG. 1, a safety valve assembly 15 is mounted into the tank port 2 of the compression gas cylinder 1 for preventing gas flow from the gas cylinder 1 into cylindrical cavity 11 of the main valve body 5. A safety valve housing 16 having a threaded end 17 is threaded into the connector stem 4 of the main valve body 5. A peripheral seal 18 is disposed between the safety valve housing 16 and the main valve body 5. To permit the passage of gas from the compression gas cylinder 1 into the cylindrical cavity 11 the safety valve housing 16 has a conduit 19 which extends through the safety valve housing 16 and communicates with the cylindrical cavity 11 of the main valve body 5. Located within conduit 19 is poppet seat 20 and poppet 21 where poppet 21 is biased by helical spring 22 into a normally closed position by forcing the poppet 21 to bear compressively against the poppet seat 20. O ring seal 23 is carried by the poppet 21 to seal the poppet seat and prevent gas flow from the gas cylinder into cylindrical cavity 11 of the main valve body 5.

The poppet 21 has a stem 24 against which frangible member 25 bears in compression which holds the poppet 21 off of the poppet seat 20. If external forces are applied to the main valve body 5 and sufficient shear and bending stresses are transmitted to the frangible member 25, the frangible member will break thereby permitting the poppet 21 to seat in poppet seat 20. This will close conduit 19 and prevent gas flow into cylindrical cavity 11. Frangible member 25 bears in compression against shoulder 26 of the main valve body and bears oppositely in compression against the poppet 21 such that bending or shear stress experienced by the main valve body 5 through the application of external forces will be transmitted to frangible member 25. To retain strength in compression but fail in shear frangible member 25 is made of a material which is of high tensile strength and low shear strength such as silicone carbide or other high tensile strength ceramics and may also be made of any of the following materials depending upon the type of gas in the gas cylinder, Elgiloy, Hastelloy, 300 Series Stainless Steel, PVDF (flouro polymer containing carbon), Tungston, Aluminun alloy, and Torlon (polyamide-imide resin), and platinum-rhodium 4000R.

In FIG. 1 it can be seen that frangible member 25 has a plate member 27 which bears against the poppet stem 24. In order to allow gas to pass through the conduit 19 into the cylindrical cavity 11, the plate member 27 is perforated. The structure of the frangible member 25 as shown in FIG. 1 consists of a columnar member which has a minimum cross-sectional area 28 located intermediate of first chamber 29 and a second chamber 30. First chamber 29 sealingly encloses plate member 27 such that gas passing through the conduit and through the perforations of plate member 27 enters into first chamber 29 and thereafter passes through orifice 31 into cylindrical cavity 11 of the main valve body 5. In order for gas to reach the inlet port 7 of the main valve body 5, an orifice 32 is located in the second chamber 30 and gas enteres through orifice 32 from cylindrical cavity 11 for passage into inlet port 7. Orifices 31 and 32 are utilized in frangible member 25 to restrict gas flow in the event a breakdown should occur downstream of the valve control assembly 3.

Although not shown in the figures, frangible member 25 may be a simple column member of regular cross-section which fails under sufficient bending or shear stress and bears against plate member 27. The frangible member of this invention is held in a fixed position relative to tank port 2 and is compressively held between the poppet 21 and the shoulder 26 of the main valve body 5 such that when a break occurs in the frangible member induced by structural disruption of the main valve, the safety valve will close and prevent further gas flow.

While I have shown and described certain embodiments of the present safety valve device, it is to be understood that it is subject to many modifications without departing from the spirit and scope of the claims as recited herein.

What is claimed is:

1. A safety valve for a compression gas cylinder to shut-off gas flow at the tank port of the cylinder when downstream gas flow control apparatus is structurally disrupted by external forces, comprising:
   (a) a housing having a conduit therethrough for the passage of gas where said housing is adapted for fitting into said tank port,
   (b) a poppet seat located in said conduit and in a fixed position relative to said tank port,
   (c) a poppet passing through said poppet seat adapted to close said conduit when said poppet bears against said poppet seat,
   (d) bias means for biasing said poppet to bear against said poppet seat whereby said conduit is normally closed,
   (e) frangible set-off means compressively disposed between said poppet and said gas control apparatus responsive to bending and shear stress transmitted to said frangible set-off means by said gas control apparatus for holding said poppet off said poppet seat such that upon sufficient external force acting upon said gas control apparatus said frangible set-off means will break before said gas control apparatus thereby closing said conduit and preventing further gas flow.

2. The safety valve device recited in claim 1 wherein said frangible set-off means further comprises a plate member bearing in compression against said poppet.

3. A safety valve device recited in claim 2 wherein said plate member has a perforation therein to permit the flow of gas therethrough.

4. The safety valve device recited in claim 3 where said frangible set-off means further comprises a columnar member which bears in compression against said plate member.

5. The safety valve device recited in claim 4 wherein said columnar member further comprises a first and second chamber where each said chamber has an orifice therein for the passage of the gas therethrough.

6. The safety valve device recited in claim 5 wherein said columar member further comprises a minimum cross-sectional area intermediate said first and said second chambers.

7. The safety valve device recited in claim 1 said frangible set-off means is made of a corrosive resistant material.

8. The safety valve device recited in claim 7 where said corrosive resistent material is silicone carbide.

9. The safety valve device recited in claim 7 where said corrosive resistent material is a high tensile strength ceramic.

10. The safety valve device recited in claim 7 where said corrosive resistent material is 300 series stainless steel.

11. In combination with a control valve adapted to be fitted to a tank port in a compression gas cylinder, said control valve being subject to damage by external forces, and having a gas inlet, a gas outlet, a valve seat between said gas inlet and gas outlet, an adjustable seal means to control gas flow from said gas inlet to said gas outlet, a safety valve fitted in said tank port upstream of said gas inlet comprising, a housing having a conduit therethrough for the passage of gas where said housing is adapted for fitting into said tank port, a poppet seat located in said conduit and in a fixed position relative to said tank port, a poppet passing through said poppet seat adapted to close said conduit when said poppet bears against said poppet seat, bias means for biasing said poppet to bear against said poppet seat whereby said conduit is normally closed, frangible set-off means responsive to bending and shear stress transmitted to said frangible set-off means by said control valve compressively disposed between said poppet and said control valve for holding said poppet off of said poppet seat such that upon sufficient external force acting upon said control valve, said frangible set-off means will break before said control valve thereby closing said conduit and preventing further gas flow.

12. The safety valve device recited in claim 11 wherein said frangible set-off means further comprises a plate member bearing in compression against said poppet.

13. The safety valve device recited in claim 12 wherein said plate member has a perforation therein to permit the flow of gas therethrough.

14. The safety valve device recited in claim 13 where said frangible set-off means further comprises a columnar member which bears in compression against said plate member.

15. The safety valve device recited in claim 14 wherein said columnar member further comprises a first and second chamber where each said chamber has an orifice therein for the passage of the gas therethrough.

16. The safety valve device recited in claim 15 wherein said columar member further comprises a minimum cross-sectional area intermediate said first and said second chamber.

17. The safety valve device recited in claim 11 wherein said frangible set-off means is made of a corrosive resistant material.

18. The safety valve device recited in claim 17 where said corrosive resistent material is silicone carbide.

19. The safety valve device recited in claim 17 wherein said corrosive resistent material is a high tensile strength ceramic.

20. The safety valve device recited in claim 17 where said corrosive resistant material is 300 series stainless steel.

21. A safety valve for a compression gas cylinder to shut-off gas flow when a tank valve mounted at the tank port of the gas cylinder is structurally disrupted by external forces, comprising:
    (a) a housing having a conduit therethrough for the passage of gas where said housing is adapted for fitting into said tank port,
    (b) a poppet seat located in said conduit and in a fixed position relative to said tank port,
    (c) a poppet passing through said poppet seat adapted to close said conduit when said poppet bears against said poppet seat,
    (d) bias means for biasing said poppet to bear against said poppet seat whereby said conduit is normally closed,
    (e) frangible set-off means compressively disposed between said poppet and said tank valve responsive to bending and shear stress transmitted to said frangible set-off means by said tank valve for holding said poppet off said poppet seat such that upon sufficient external force acting upon said tank valve said frangible set-off means will break before said tank valve thereby closing said conduit and preventing further gas flow.

22. The safety valve device recited in claim 21 wherein said frangible set-off means further comprises a plate member bearing in compression against said poppet.

23. The safety valve device recited in claim 22 wherein said plate member has a perforation therein to permit the flow of gas therethrough.

24. The safety valve device recited in claim 23 where said frangible set-off means further comprises a columnar member which bears in compression against said plate member.

25. The safety valve device recited in claim 24 wherein said columnar member further comprises a first and second chamber where each said chamber has an orifice therein for the passage of gas therethrough.

26. The safety valve device recited in claim 25 wherein said columnar member further comprises a minimum cross-sectional area intermediate said first and said second chambers.

27. The safety valve device recited in claim 21 wherein said frangible set-off means is made of a corrosive resistant material.

28. The safety valve device recited in claim 27 where said corrosive resistant material is silicone carbide.

29. The safety valve device recited in claim 27 where said corrosive resistant material is a high tensile strength ceramic.

30. The safety valve device recited in claim 27 where said corrosive resistant material is 300 series stainless steel.

* * * * *